Oct. 13, 1959     F. W. ROBERTSON     2,908,328
SQUARE TUBING CUTOFF TOOL
Filed Aug. 31, 1956
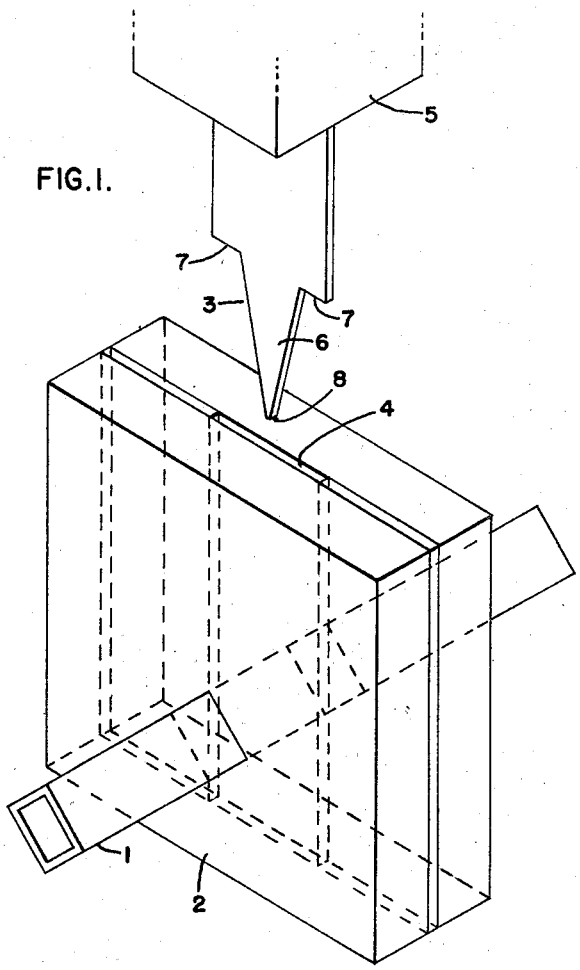
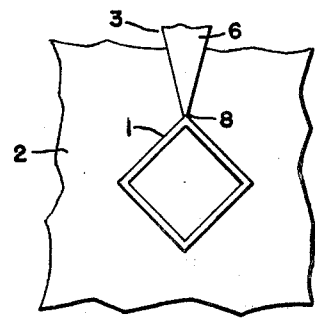
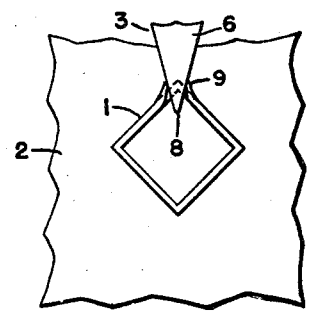
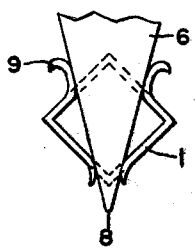
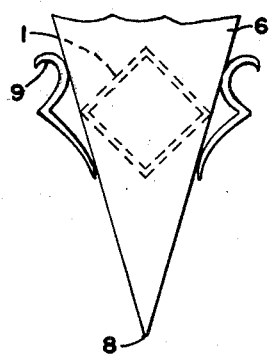
INVENTOR:
FREDERICK W. ROBERTSON,
BY *Michael Masnick*
HIS AGENT.

United States Patent Office 2,908,328
Patented Oct. 13, 1959

2,908,328

SQUARE TUBING CUTOFF TOOL

Frederick W. Robertson, Utica, N.Y., assignor to General Electric Company, a corporation of New York Application August 31, 1956, Serial No. 607,412

2 Claims. (Cl. 164—47)

This invention relates to the art of shearing devices and more particularly to the art of cutting hollow tubing.

In recent years increased emphasis has been placed on the use of hollow tubing for construction purposes, particularly in the construction of electronic chassis. The use of this tubing has brought about the concomitant problem of cutting accurate lengths of tubing directly usable in construction of finished equipments.

Although the prior art has developed several cutting techniques such as abrasive wheel cutoff apparatus and milling operations, accuracy has been limited without the creation of internal burrs. Where accuracy has been maintained with the concomitant creation of internal burrs, expensive hand removal of internal burrs has been necessary.

It is, therefore, one object of my invention to provide improved tubing cutoff apparatus for the cutting of accurately measurable lengths of finished tubing.

It is a further object of my invention to provide improved method and means for cutting tubing without the creation of internal burrs.

A further object of my invention is to provide an improved shearing method and means for hollow tubing.

The novel features which I believe to be characteristic of my invention are set forth with particularity in the appended claims. My invention itself, however, both as to its organization and method of operation, together with further objects and advantages thereof, may best be understood by reference to the following description, taken in connection with the accompanying drawings, in which:

Figure 1 is a perspective view of one embodiment of my invention; and

Figures 2, 3, 4 and 5 are cross-sectional views of one embodiment of my invention in various stages of operation.

In Figure 1 there is shown a length of hollow square tubing 1, such as chrome molybdenum tubing now popular for use in electronic chassis, inserted within a die 2. A punch 3 is driven within the cavity 4 of the die 2 to cut the tubing 1 along a predetermined line. The punch can be driven by conventional driving means such as a hydraulic ram 5. The length of tubing from the punch face to an end can be measured manually or by automatic feed positioners.

The punch comprises a body portion on which is mounted a shearing portion 6. In this embodiment the shearing portion takes the form of an isosceles triangle, the base of which joins the body section in such manner as to form shoulders 7 and the apex 8 which forms a point for initially piercing the tubing 1. The shearing portion cuts the tubing by shearing action which forms two chips, which are forced clear of the die by the shoulders 7. The sides of the punch are flat and maintained with such tolerances with respect to the die cavity 4, that the length of the tubing from one end to the cut can be accurately measured and controlled. The accuracy is determined by the specific application. The operation of the punch in shearing the tubing may best be understood by referring to Figures 2, 3, 4 and 5.

In Figure 2, there is shown a cross-section of the tubing 1 mounted within die 2. As the punch 3 descends the piercing apex contacts the corner of the tubing. Since the corner of the tubing is structurally strong, particularly since the die supports the tubing walls, the punch will enter the tubing without crushing. Because of the internal stress at the corners imposed by manufacture, such as extrusion, of the tubing, such as a chrome-molybdenum alloy tubing, the punch enters without burr since the tube corner splits in front of the descending punch. To pierce the tube, the included angle at the apex is maintained as small as possible. The limiting factor is tool strength.

In Figure 3 is shown the start of chip formation. The narrow angle of the shearing portion of the punch forces the tubing walls outward. The die supports the walls on both sides of the punch as the punch applies outward force. As the punch is driven in the cutting stroke, the walls are sheared between the punch and the die, starting the formation of chips 9.

In Figure 4 there is shown a cross-section of the tubing 1 as the apex pierces the lower corner of the tubing. The shearing action on the tube walls now occurs at both top and bottom in the formation of chip 9.

In Figure 5 there is shown the completed cut of the tubing with the resultant chips 9. Since the tube has been cut by a shearing action between the die and the punch exerting pressure from the inside of the tubing, the cut end of the tube has no internal burring. Therefore, the tubing is usable directly in applications wherein assembly uses the method of insertion of doweling or fittings.

An external burr may be formed dependent upon the tolerance between the tubing dimensions and the die dimensions. With normal manufacturing tolerances, the external burr is so small that it is removed by subsequent plating operations. In those applications where the tolerance cannot be maintained, any external burr is easily and cheaply removed by wire brush, chemical treatment or equivalent known methods.

The operation of the punch will, of course, be satisfactory if the apex is a sharp point. In practice, however, it has been found that a sharply pointed apex will break, thereby shortening tool life. For this reason, it has been found desirable to construct the shearing portion of the punch with a flat apex of approximately 0.009-in.

As mentioned previously, the angle at the apex of the shearing portion of the punch should be as small as possible without adversely affecting tool strength and life. In one embodiment I have found that a punch constructed of tool steel with a shearing portion measuring 1.14-inches from base to apex on a 0.56-in. base was satisfactory. It will be recognized that once having made the determination of the proper angle at the apex, the most feasible construction is that of a straight solid triangle. Although the sides may be curved, no advantage usually accrues from such design.

It will be recognized by those skilled in the art that the drive for the punch must be suitable for a shearing operation. A drive producing an impact will cause the tubing material to momentarily leave the face of the shearing portion of the punch, thereby causing the formation of an undesirable plurality of chips, tubing crushing, and excessive burring. Although the drive rate for the shearing operation depends upon the tubing material and the cycle time allowable, it has been found in one embodiment using chrome-molybdenum tubing and a punch of tool steel that a punch feed rate of approximately 4 feet per minute is an optimum considering tool life and production rate. Because of the shearing operation, in general, no minimum punch feed rate exits. Higher feed rates can be used with stronger punch material or if a higher punch replacement rate can be tolerated. In those applications where the length of the cut tubing must be accurately controlled, it will, of course, be apparent to those skilled in the art that the tolerance between the punch and the walls of the die cavity 4 must be small since the usual tubing positioners will determine distance from one cavity wall to the end of the tubing. If the measurement is made from the end of the tubing to the far wall of the die cavity, it will be apparent that the punch should be a multiple of the unit measure for the most convenient positioning. It has been found feasible to hold the total tolerance between punch and die cavity width to 0.001-in. in operation of one embodiment.

It will be apparent to those skilled in the art that the die can be constructed of an upper and lower pair of V-shaped sections, with each pair separated for passage of the punch and movable in pairs to releasably grip the tubing.

While a specific embodiment has been shown and described, it will, of course, be understood that various modifications may yet be devised by those skilled in the art which will embody the principles of the invention and found in the true spirit and scope thereof.

What I claim as new and desire to secure by Letters Patent of the United States is:

1. Apparatus for cutting square hollow tubing comprising die means for supportably engaging the tubing, said die means having a cavity therethrough extending along a diagonal of the tubing, punch means comprising a body portion and a shearing portion, adapted to be received within the cavity, said body portion substantially fitting the cavity, said shearing portion having two shearing edges of substantially equal length extending from said body portion to a piercing apex, the angle included by said shearing edges being no greater than 45°, said shearing portion having at some point a dimension perpendicular to said diagonal at least equal to the greatest cross-sectional dimension of the tubing perpendicular to the diagonal, and means for driving said punch means through the cavity in a cutting stroke, the apex of said shearing means following a path along said diagonal during the cutting stroke, whereby a perimetric portion of the tubing walls is sheared outwardly from the tubing during the cutting stroke leaving no internal burrs at the sheared edges.

2. Apparatus for cutting rectangular hollow tubing comprising die means for supportably engaging the tubing, said die means having a cavity therethrough extending along a diagonal of the tubing, punch means comprising a body portion and a shearing portion, adapted to be received within the cavity, said body portion substantially fitting the cavity, said shearing portion having two shearing edges extending from said body portion to a piercing apex, the angle included by said shearing edges being no greater than 45°, said shearing portion having at some point a dimension perpendicular to the diagonal at least equal to the greatest cross-sectional dimension of the tubing perpendicular to the diagonal, and means for driving said punch means through the cavity in a cutting stroke, the apex of said shearing means following a path along the diagonal during the cutting stroke, whereby a perimetric portion of the tubing walls is sheared outwardly from the tubing during the cutting stroke leaving no internal burrs at the sheared edges.

References Cited in the file of this patent

UNITED STATES PATENTS

| | | |
|---|---|---|
| 1,161,705 | Lloyd | Nov. 23, 1915 |
| 1,269,635 | Neuman | June 18, 1918 |
| 1,498,550 | Johnson | June 24, 1924 |
| 1,648,829 | Sessions | Nov. 8, 1927 |
| 2,198,599 | Borzym | Apr. 30, 1940 |
| 2,250,931 | Greider | July 29, 1941 |
| 2,361,595 | Broersma | Oct. 31, 1944 |
| 2,678,097 | Hahn et al. | May 11, 1954 |
| 2,741,309 | Czarnik | Apr. 10, 1956 |